(12) United States Patent
Dennis

(10) Patent No.: US 6,547,709 B1
(45) Date of Patent: Apr. 15, 2003

(54) METHOD OF FOLDING AN AIR BAG

(75) Inventor: Michael K. Dennis, Lakeland, FL (US)

(73) Assignee: Breed Automotive Technology, Inc., Lakeland, FL (US)

( * ) Notice: Subject to any disclaimer, the term of this patent is extended or adjusted under 35 U.S.C. 154(b) by 98 days.

(21) Appl. No.: 09/644,467

(22) Filed: Aug. 23, 2000

(51) Int. Cl.⁷ .............................................. B31B 1/26
(52) U.S. Cl. ...................... 493/405; 493/408; 493/409; 280/728.1; 280/743.1
(58) Field of Search ................................ 493/405, 408, 493/409; 280/728.1, 743.1

(56) References Cited

U.S. PATENT DOCUMENTS

| | | | |
|---|---|---|---|
| 4,004,828 A | 1/1977 | Sogabe et al. ............... 280/743 |
| 5,425,552 A | 6/1995 | Linder ...................... 280/743.1 |
| 5,529,339 A | 6/1996 | Niederman ............... 280/743.1 |
| 5,599,040 A | * 2/1997 | Takahashi et al. |
| 5,607,182 A | * 3/1997 | Nelsen et al. |
| 5,615,915 A | 4/1997 | Magoteaux ............... 280/743.1 |
| 5,681,052 A | * 10/1997 | Ricks et al. |
| 5,823,567 A | * 10/1998 | Behr et al. |
| 5,855,393 A | * 1/1999 | Keshavarag |
| 5,899,495 A | 5/1999 | Yamamoto et al. ...... 280/743.1 |
| 6,092,839 A | 7/2000 | Nagano ................... 280/743.1 |
| 6,149,568 A | * 11/2000 | Ross et al. |
| 6,152,867 A | * 11/2000 | Heudorfer et al. |
| 6,196,585 B1 | * 3/2001 | Igawa |

OTHER PUBLICATIONS

XP–000824882, "Air Bag Folding Method" Research Disclosure, Kenneth Mason Publications, Hampshire, GB, No. 413. Sep. 1998 pp. 1207–1208/ISSN: 0374–4353, The Whole Document.

* cited by examiner

Primary Examiner—Eugene Kim
(74) Attorney, Agent, or Firm—Jarett Rieger

(57) ABSTRACT

A method of folding an air bag consisting of the following steps: providing an air bag with a square configuration; folding four corners of the air bag toward the center of the air bag resulting in a smaller square configuration; repeating said folding step to place the air bag in a smaller square configuration; folding a resulting left corner of the air bag toward the center of the air bag; folding a resulting right corner of the air bag toward the center of the air bag; and pinching lower and upper portions of the air bag while folding the lower and upper portions, respectively, toward the center of the air bag.

3 Claims, 3 Drawing Sheets

METHOD OF FOLDING AN AIR BAG

TECHNICAL FIELD

The present invention relates to a method of folding an air bag for a vehicle occupant restraint system.

BACKGROUND ART

Air bags have been used for some time to provide impact protection to occupants of passenger vehicles. The air bags are often stored in the dashboard or steering wheel of the vehicle with restricted space for the placement of the air bag. In the event of an accident, the air bag is inflated. The characteristics of the air bag's deployment are determined by the method of folding the air bag.

A conventional air bag fold consists of two accordian or back folded halves that are then folded into each other. This conventional method of folding an air bag creates a thick air bag. Other methods of folding air bags have been developed over the years. In U.S. Pat. No. 5,615,915, Magoteaux discloses a method of folding an air bag placed in a square configuration comprising repetitive folding of the four corners inward.

OBJECTIVES AND SUMMARY OF THE INVENTION

An object of the present invention is to provide an improved method of folding an air bag. Another object is to provide a method of folding an airbag to reduce the width and thickness of the pack area. A further object is to provide a method of folding an air bag that has minimal dimensional variation from bag pack to bag pack.

The method of folding an air bag in accordance with this invention consists of providing an air bag in a substantially square configuration, folding four corners of the air bag toward the center of the airbag, folding a left corner toward the center of the air bag, folding a right corner toward the center of the air bag. And folding the lower and upper corners of the air bag, respectively, toward the center of the air bag.

Other objects and advantages of the present invention will be apparent to those skilled in the art from the following description, the accompanying drawings, and the appended claims.

BRIEF DESCRIPTION OF THE DRAWINGS

Further features of the present invention will become apparent to those skilled in the art to which the present invention relates from reading the accompanying drawings, in which.

DETAILED DESCRIPTION OF THE INVENTION

Figure 1:
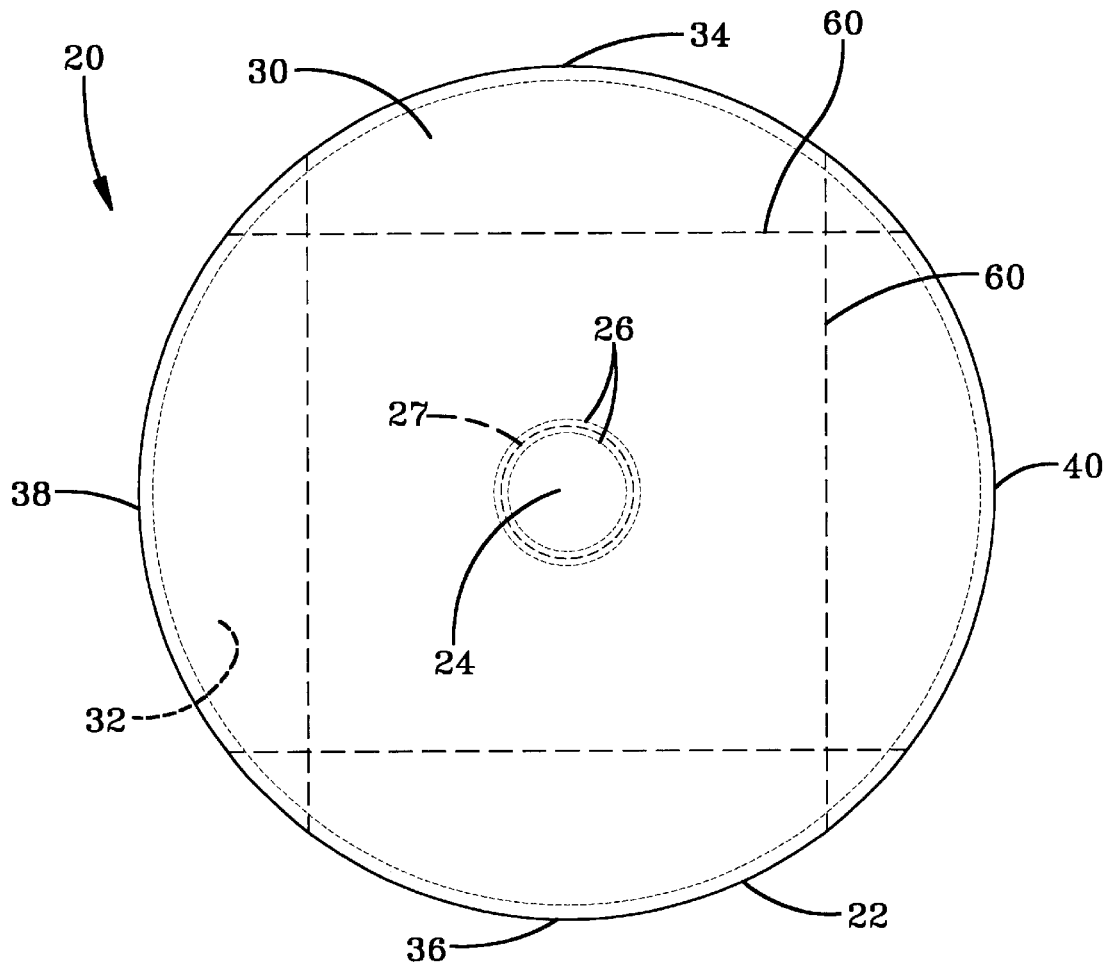
FIG. 1 shows a round airbag in an initial unfolded and not inflated condition.
Figure 10:
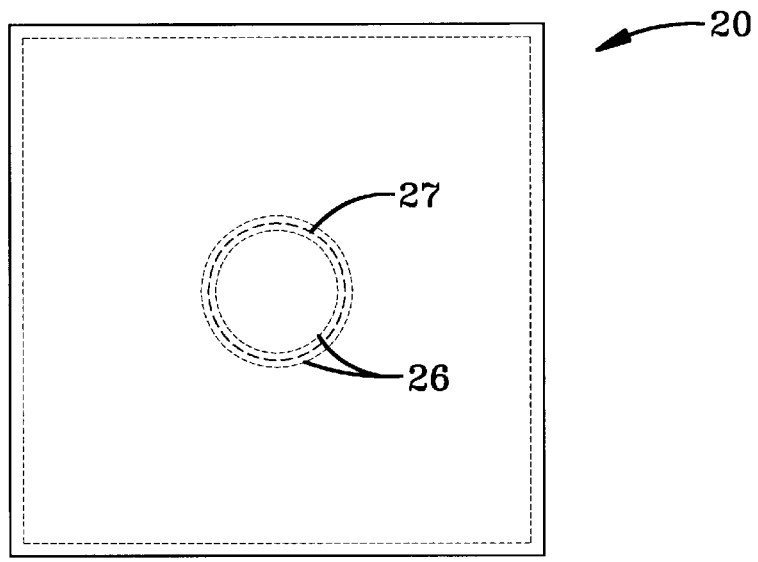
FIG. 10 shows a square air bag in an initial unfolded and not inflated condition.

In one preferred embodiment, the air bag 20 is substantially circular along its outer circumference 22 as shown in FIG. 1 in an unfolded and not inflated condition. In this embodiment, the air bag is a driver's side air bag to be mounted in the steering wheel of a passenger vehicle. However, this method of folding could be used for driver side air bags placed in other locations in the vehicle and for other types of air bags, including side and passenger side air bags. Although, a round air bag is shown, the air bag may be other shapes. For example, a square air bag as shown in FIG. 10 may be used, eliminating the first folding step shown in FIG. 2.

Near the center 24 of the air bag is a sewn tether stitch 26 and an air bag ring 27. The air bag ring 27 is positioned between a front panel 30 and a back panel 32 of the air bag. In addition, the air bag has a top side 34, a bottom side 36, a left side 38, and a right side 40.

Figure 2:
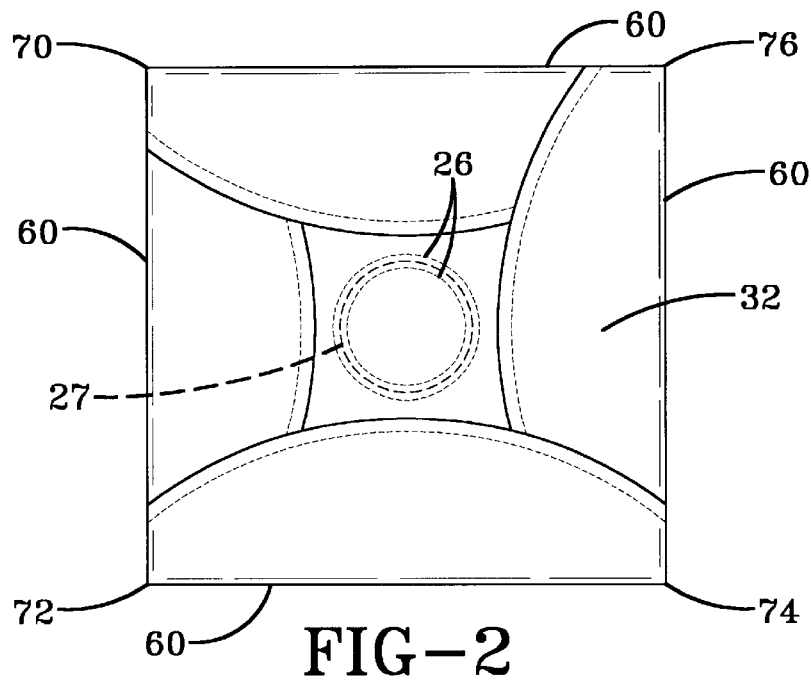
FIGS. 2–9 are views showing the air bag in successively folded conditions.
Figure 3:
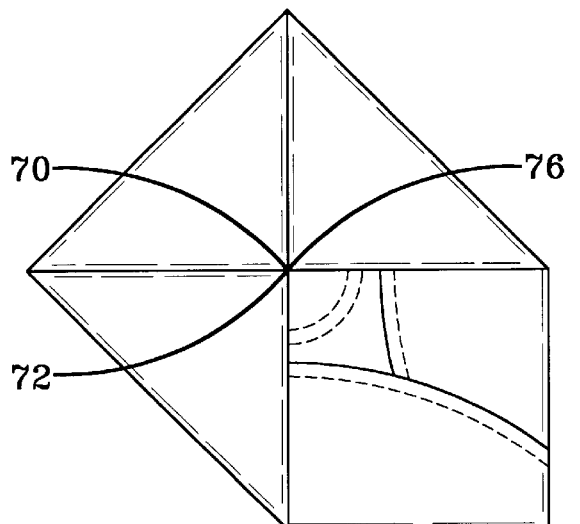
Figure 4:
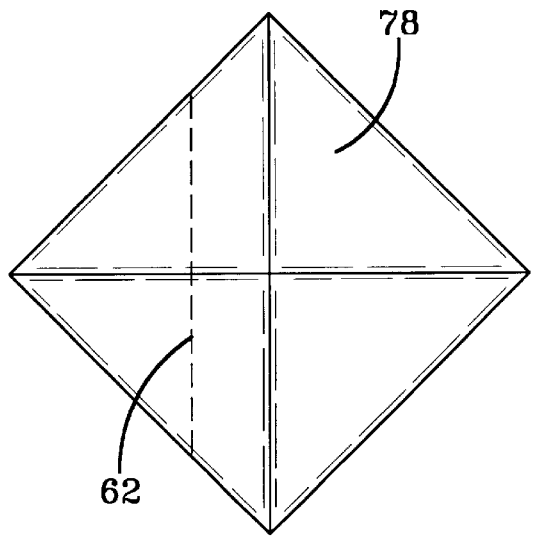
Figure 5:
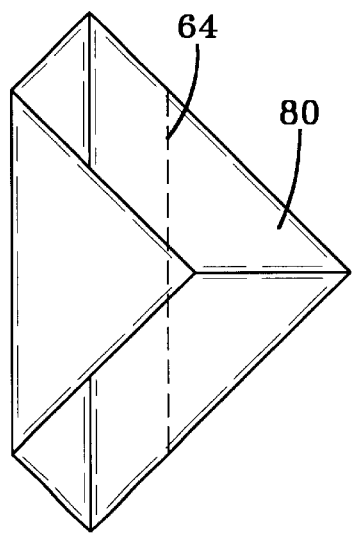
Figure 6:
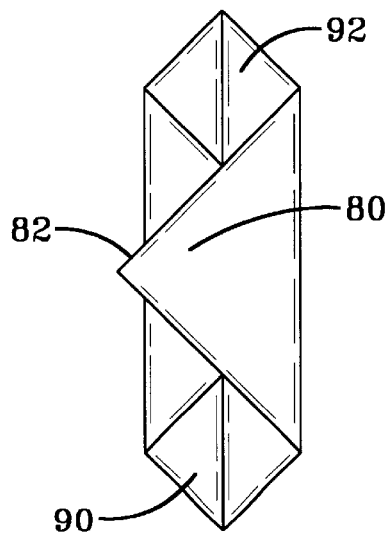
Figure 7:
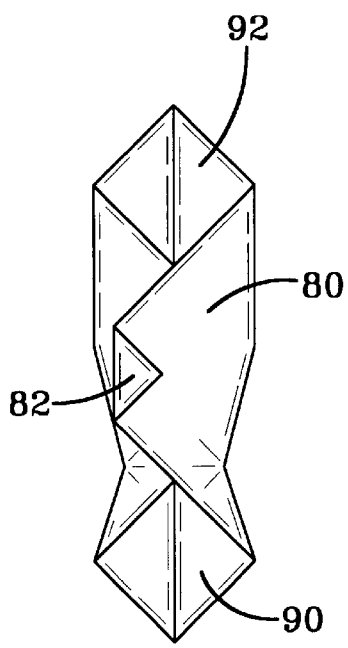
Figure 8:
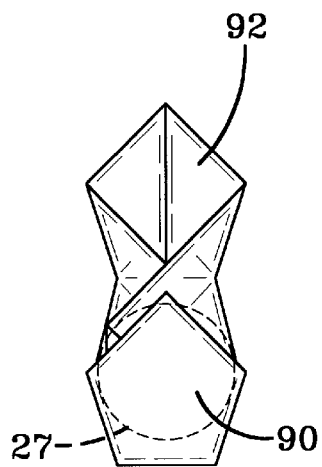
Figure 9:
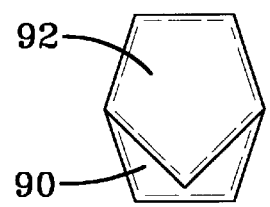

In accordance with the present invention, as shown in FIG. 2, the top, bottom, left and right sides are folded along first fold lines 60 toward the center of the air bag to create substantially a square shape. The four sides of the air bag 34, 36, 38 and 40 are folded toward the center 24 of the air bag so that the outside edges of the air bag 20 are tangent to the central tether stitch 26. The resulting air bag has four corners 70, 72, 74, 76. As shown in FIG. 3, the corners are folded into the center of the air bag. Preferably, this step is repeated as shown in FIG. 4 and rotated so that a corner is facing up. Then, a left side of the folded bag 78 is folded along a second fold line 62 at the left edge of the bag ring as shown in FIG. 5. In the preferred embodiment, the bag is folded approximately 35 mm to the left of the center 24 of the air bag. The resulting right flap 80 is folded back along the right edge of the bag ring, along fold line 64, see FIG. 6. This step results in an overlapping tip 82. Next, as shown in FIG. 7, the overlapping tip 82 of the folded flap is folded back to the center 24 of the bag. Then, a lower portion 90 of the bag is pinched approximately 60 mm in width while folding the lower portion of the bag to the lower edge of the bag ring 27 as shown in FIG. 8. This pinching and folding step is repeated for an upper portion 92 of the bag as shown in FIG. 9. Although pinching is used in the preferred method, an automated means may be used to accomplish the required width.

This method of folding an air bag is unique, in that the height, width and thickness of the resulting airbag pack are roughly one third smaller than a conventional fold. In addition, this folding technique results in very little dimensional variation from bag pack to bag pack.

In the preferred folding method, the folding is performed with an inflator positioned in the center of the air bag. In addition, having the above folds not pulled tight to the inflator allows for easier installation of the air bag into the airbag module. To further reduce the bag pack size, the air bag pack may be wrapped with TYVEK, manufactured by Dupont, or appropriate material before inserting the air bag into the pack area.

The present method of folding an airbag could also be used to fold a substantially square air bag as shown in FIG. 10. The steps for folding a square air bag would be the same as shown in FIGS. 3–9, skipping the initial step shown in FIG. 2.

It is to be understood that while the presently preferred embodiments of the present invention have been described, various changes and modifications may be made by those skilled in the art without departing from the scope of the invention as set forth in the claims.

What is claimed is:

1. A method of folding an air bag, comprising the steps of:
   providing an air bag in a substantially square configuration, the air bag having a center;
   folding four corners of the air bag toward the center of the air bag to place the air bag in a smaller substantially square configuration;

folding a resulting left corner of the air bag toward the center of the air bag, wherein the left corner is folded beyond the center of the airbag;

folding a resulting right corner of the air bag toward the center of the air bag, wherein the right corner is folded beyond the center of the airbag forming an overlapping tip, the overlapping tip is folded toward the center of the air bag;

pinching first side of the lower portion toward second side of the lower portion along with pinching the second side of the lower portion toward the first side of the lower portion, and then fold the lower portion toward the center of the airbag; and pinching first side of the upper portion toward second side of the upper portion along with pinching the second side of the upper portion toward the first side of the upper portion, and then fold the upper portion toward the center of the airbag; wherein the resulting folded airbag has a hexagonal two dimensional shape when viewing a back panel of the folded airbag.

2. The method of folding an air bag according to claim 1 wherein after folding four corners of the air bag, said method further comprises the step of:

repeating said folding step to place the air bag in a smaller square configuration.

3. The method of folding an air bag according to claim 1 wherein the step of placing the air bag in a substantially square configuration comprises the steps of:

providing a round air bag having left, right, top and bottom edges; and folding the left, right, top and bottom edges toward the center of the air bag along fold lines tangent a center ring of the air bag to place the air bag in a substantially square configuration.

* * * * *